US008775361B2

(12) United States Patent
Goel et al.

(10) Patent No.: US 8,775,361 B2
(45) Date of Patent: *Jul. 8, 2014

(54) STOCHASTIC PROGRAMMING-BASED DECISION SUPPORT TOOL FOR RESERVOIR DEVELOPMENT PLANNING

(75) Inventors: Vikas Goel, Houston, TX (US); Kevin C. Furman, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 711 days.

This patent is subject to a terminal disclaimer.

(21) Appl. No.: 12/864,987

(22) PCT Filed: Mar. 9, 2009

(86) PCT No.: PCT/US2009/036536
§ 371 (c)(1),
(2), (4) Date: Jul. 28, 2010

(87) PCT Pub. No.: WO2009/131761
PCT Pub. Date: Oct. 29, 2009

(65) Prior Publication Data
US 2010/0332442 A1 Dec. 30, 2010

Related U.S. Application Data

(60) Provisional application No. 61/124,929, filed on Apr. 21, 2008.

(51) Int. Cl.
G06F 9/44 (2006.01)
(52) U.S. Cl.
USPC .............................. 706/52; 703/10
(58) Field of Classification Search
USPC ........................................... 703/10
See application file for complete search history.

(56) References Cited

U.S. PATENT DOCUMENTS 5,729,451 A   3/1998  Gibbs et al.
5,764,515 A   6/1998  Guerillot et al.
(Continued)

FOREIGN PATENT DOCUMENTS

CA   2 529 339   12/2004
EP   1 865 340   12/2007
(Continued)

OTHER PUBLICATIONS

L. Saputelli, M. Nikolaou, M. J. Economides. Real-time reservoir management: A multiscale adaptive optimization and control approach. Computational Geosciences. Mar. 2006, vol. 10, Issue 1, pp. 61-96.*

(Continued)

Primary Examiner — Jeffrey A Gaffin
Assistant Examiner — David H Kim
(74) Attorney, Agent, or Firm — ExxonMobil Upstream Research Company, Law Dept.

(57) ABSTRACT

A stochastic programming-based decision support tool for reservoir development planning can comprise a source of input data, an optimization model, a high fidelity model for simulating the reservoir, and one or more solution routines interfacing with the optimization model. The optimization model can consider unknown parameters having uncertainties directly within the optimization model. The model incorporates the flexibility that a decision-maker has in the real world and allows the decision-maker to adjust the decisions based on new information. The model can systematically address uncertain data, for example comprehensively or even taking all uncertain data into account. Accordingly, the optimization model can provide flexible or robust solutions that remain feasible over an uncertainty space. Once the reservoir model is optimized, final development plans may be generated.

11 Claims, 9 Drawing Sheets

(56) References Cited

U.S. PATENT DOCUMENTS

| | | | |
|---|---|---|---|
| 5,798,982 A | 8/1998 | He et al. |
| 5,878,372 A | 3/1999 | Tabarovsky et al. |
| 6,067,340 A | 5/2000 | Eppstein et al. |
| 6,128,577 A | 10/2000 | Assa et al. |
| 6,216,083 B1 | 4/2001 | Ulyanov et al. |
| 6,230,101 B1 | 5/2001 | Wallis |
| 6,246,963 B1 | 6/2001 | Cross et al. |
| 6,381,505 B1 | 4/2002 | Kassmann et al. |
| 6,522,973 B1 | 2/2003 | Tonellot et al. |
| 6,609,060 B2 | 8/2003 | Ulyanov et al. |
| 6,618,695 B1 | 9/2003 | Hu et al. |
| 6,662,109 B2 | 12/2003 | Roggero et al. |
| 6,674,432 B2 | 1/2004 | Kennon et al. |
| 6,721,718 B2 | 4/2004 | Ulyanov |
| 6,775,578 B2 | 8/2004 | Couet et al. |
| 6,813,565 B1 | 11/2004 | Hu et al. |
| 6,823,297 B2 | 11/2004 | Jenny et al. |
| 6,826,483 B1 | 11/2004 | Anderson et al. |
| 6,826,486 B1 | 11/2004 | Malinverno |
| 6,907,392 B2 | 6/2005 | Bennis et al. |
| 6,912,491 B1 | 6/2005 | Van Bemmel |
| 6,941,255 B2 | 9/2005 | Kennon et al. |
| 6,980,940 B1 | 12/2005 | Gurpinar et al. |
| 7,006,951 B2 | 2/2006 | Pond, Jr. et al. |
| 7,027,964 B2 | 4/2006 | Kennon |
| 7,043,413 B2 | 5/2006 | Ward et al. |
| 7,047,165 B2 | 5/2006 | Balaven et al. |
| 7,054,752 B2 | 5/2006 | Zabalza-Mezghani et al. |
| 7,096,122 B2 | 8/2006 | Han |
| 7,096,172 B2 | 8/2006 | Colvin et al. |
| 7,149,671 B2 | 12/2006 | Lim et al. |
| 7,200,533 B2 | 4/2007 | Hu et al. |
| 7,200,540 B2 | 4/2007 | Colvin et al. |
| 7,254,091 B1 | 8/2007 | Gunning et al. |
| 7,260,508 B2 | 8/2007 | Lim et al. |
| 7,277,806 B2 | 10/2007 | Lu et al. |
| 7,310,579 B2 | 12/2007 | Ricard et al. |
| 7,369,973 B2 | 5/2008 | Kennon et al. |
| 7,392,166 B2 | 6/2008 | Le Ravalec-Dupin et al. |
| 7,426,460 B2 | 9/2008 | Noetinger et al. |
| 7,430,501 B2 | 9/2008 | Feraille et al. |
| 7,451,066 B2 | 11/2008 | Edwards et al. |
| 7,478,024 B2 | 1/2009 | Gurpinar et al. |
| 7,496,488 B2 | 2/2009 | Jenny et al. |
| 7,546,228 B2 | 6/2009 | Cullick et al. |
| 7,546,229 B2 | 6/2009 | Jenny et al. |
| 7,558,715 B2 | 7/2009 | Schaaf et al. |
| 7,577,061 B2 | 8/2009 | Williamson et al. |
| 7,584,081 B2 | 9/2009 | Wen et al. |
| 8,417,496 B2 | 4/2013 | Main et al. |
| 2002/0042702 A1 | 4/2002 | Calvert et al. |
| 2002/0133958 A1* | 9/2002 | Noureldin et al. ............. 33/304 |
| 2003/0093392 A1 | 5/2003 | Ulyanov |
| 2003/0225606 A1 | 12/2003 | Raghuraman et al. |
| 2004/0220790 A1 | 11/2004 | Cullick et al. |
| 2005/0010383 A1 | 1/2005 | Le Ravalec-Dupin et al. |
| 2005/0015226 A1 | 1/2005 | Le Ravalec-Dupin et al. |
| 2005/0096893 A1 | 5/2005 | Feraille et al. |
| 2005/0120195 A1 | 6/2005 | Kumar |
| 2005/0192855 A1 | 9/2005 | Chitty et al. |
| 2006/0047489 A1 | 3/2006 | Scheidt et al. |
| 2006/0241925 A1 | 10/2006 | Schaaf et al. |
| 2006/0247990 A1 | 11/2006 | Narayanan et al. |
| 2007/0073527 A1 | 3/2007 | Flandrin et al. |
| 2007/0094187 A1 | 4/2007 | Anderson et al. |
| 2007/0094216 A1 | 4/2007 | Mathias et al. |
| 2007/0156377 A1 | 7/2007 | Gurpinar et al. |
| 2007/0179766 A1 | 8/2007 | Cullick et al. |
| 2007/0226158 A1* | 9/2007 | Woronow et al. ............... 706/17 |
| 2007/0265815 A1 | 11/2007 | Couet et al. |
| 2007/0294034 A1 | 12/2007 | Bratton et al. |
| 2008/0077371 A1 | 3/2008 | Yeten et al. |
| 2008/0091353 A1 | 4/2008 | Krumhansl et al. |
| 2008/0167849 A1 | 7/2008 | Hales et al. |
| 2008/0288226 A1 | 11/2008 | Gurpinar et al. |
| 2008/0288336 A1 | 11/2008 | Charuk et al. |
| 2009/0006057 A1 | 1/2009 | Niu et al. |
| 2009/0164187 A1 | 6/2009 | Habashy et al. |
| 2009/0164188 A1 | 6/2009 | Habashy et al. |
| 2009/0234625 A1 | 9/2009 | Zangl et al. |
| 2009/0306866 A1* | 12/2009 | Malikopoulos ................. 701/59 |
| 2010/0185422 A1* | 7/2010 | Hoversten ......................... 703/2 |
| 2011/0172976 A1* | 7/2011 | Budiman et al. .................. 703/2 |

FOREIGN PATENT DOCUMENTS

| | | |
|---|---|---|
| WO | WO 01/55939 | 8/2001 |
| WO | WO 01/62603 | 8/2001 |
| WO | WO 2006/119099 | 11/2006 |
| WO | WO 2007/058662 | 5/2007 |
| WO | WO 2009/128972 | 10/2009 |
| WO | WO 2009/131761 | 10/2009 |
| WO | WO 2009/145960 | 12/2009 |

OTHER PUBLICATIONS

Goel, Vikas, and Ignacio E. Grossmann. "A class of stochastic programs with decision dependent uncertainty." Mathematical programming 108.2 (2006): 355-394.*

Goel and Grossmann. A stochastic programming approach to planning of offshore gas field developments under uncertainty in reserves. Computers and Chemical Engineering 28 (2004) 1409-1429.*

Bittencourt et al. Reservoir Development and Design Optimization. In SPE Annual Technical Conference and Exhibition, Oct. 5, 1997, San Antonia, TX. Society of Petroleum Engineers, 1997.*

Seyed Jamshid Mousavi, Kourosh Mandizadeh, Abbas Afshar, A stochastic dynamic programming model with fuzzy storage states for reservoir operations, Advances in Water Resources, vol. 27, Issue 11, 2004, pp. 1105-1110.*

Atamtürk, A. (2007), "Strong Formulations of Robust Mixed 0-1 Programming", Mathematical Programming, v108, pp. 235-250.

Bellman, R. (1957), "A Markovian Decision Process," *Journal of Mathematics and Mechanics* 6, pp. 679-684.

Ben-Tal, A. et al. (1999), "Robust Solutions to Uncertain Linear Programs", Operations Research Letters, v25, pp. 1-13.

Ben-Tal, A. et al. (1998), "Robust Convex Optimization", Mathematics of Operations Research, v23, n4, pp. 769-805.

Ben-Tal, A. et al. (2002), "Robust Optimization—Methodology and Applications", Mathematical Programming, v92, pp. 453-480.

Bertsimas, D. et al. (2004), "The Price of Robustness", Oper. Res., v52, n1, pp. 35-53.

Haugen, K.K. (1996), "A stochastic dynamic programming model for scheduling of offshore petroleum fields with resource uncertainty," *European Journal of Operational Research* 88(1), pp. 88-100.

Mezzomo, C.C. et al., "Field Development Planning Optimization Using Reservoir Simulation", Universidade Estadual de Campinas, 8 pgs.

Ordonez, F. (2004), "Lecture 1: Introduction to Robust Optimization", http://ww-ref.use/edu/fordon/robopt04/, 9 pgs.

Robust Optimization, http:/en.wikipedia.org/wiki/Robust_optimization, 4 pages.

Sweet, M.L. et al. (2007), Genesis field, Gulf of Mexico: Recognizing reservoir compartments on geologic and production time scales in deep-water reservoirs, *AAPG Bulletin* 91(12), pp. 1701-1729.

van Essen, G.M. et al. (2006), "Robust Waterflooding Optimization of Multiple Geological Scenarios", SPE 102913, 2006 SPE Annual Tech. Conf. & Exh., San Antonio, TX, Sep. 24-27, 2006, 7 pgs.

van Essen, G.M. et al. (2006), "Robust Optimization of Oil Reservoir Flooding", Control Applications, 1 pg.

White, D.J. (1993), "A Survey of Applications of Markov Decision Processes," *Jounral of Operational Research Society* 44(11), pp. 1073-1096.

Zandvliet, M. (2004), "Control in reservoir engineering under model uncertainty", Dept. of Geotechnology, Section Petroleum Engineering (Smart Wells group), 2 pgs.

(56) References Cited

OTHER PUBLICATIONS

Zhang, Y. (2007), "General Robust-Optimization Formulation for Nonlinear Programming", *J. of Optimization Theory and Applns.* 132(1), pp. 111-124.
European Search Report, dated Dec. 29, 2008, EP Application No. 08159867.4.
International Search Report and Written Opinion, dated Apr. 22, 2009, PCT/US2009/036540.
International Search Report and Written Opinion, dated Mar. 23, 2009, PCT/US2009/032736.
International Search Report and Written Opinion, dated May 4, 2009, PCT/US2009/036536.
U.S. Appl. No. 61/124,500, filed Apr. 17, 2008, Furman et al.
U.S. Appl. No. 61/124,681, filed Apr. 18, 2008, Goel et al.
U.S. Appl. No. 61/124,929, filed Apr. 21, 2008, Goel et al.

* cited by examiner

STOCHASTIC PROGRAMMING-BASED DECISION SUPPORT TOOL FOR RESERVOIR DEVELOPMENT PLANNING

CROSS-REFERENCE TO RELATED APPLICATIONS

This application is the National Stage of International Application No. PCT/US2009/036546, that published as WO 2009/131761, filed 9 Mar. 2009, which claims the benefit of U. S. Provisional Application No. 61/124,929, filed 21 Apr. 2008, each of which is incorporated herein by reference, in its entirety, for all purposes.

This application is related to the following applications: U.S. Provisional Patent Application 61/124,500 filed Apr. 17, 2008 titled ROBUST OPTIMIZATION-BASED DECISION SUPPORT TOOL FOR RESERVOIR DEVELOPMENT PLANNING; and U.S. Provisional Patent Application 61/124,681 filed Apr. 18, 2008 and PCT application PCT/US09/32736 filed Jan. 30, 2009 titled MARKOV DECISION PROCESS-BASED DECISION SUPPORT TOOL FOR RESERVOIR DEVELOPMENT PLANNING. These applications are incorporated by reference herein in their entirety.

TECHNICAL FIELD

This description relates generally to oil and gas production, and more particularly to reservoir development planning that takes uncertainty into consideration.

BACKGROUND

Developing and managing petroleum resources often entails committing large economic investments over many years with an expectation of receiving correspondingly large financial returns. Whether a petroleum reservoir yields profit or loss depends largely upon the strategies and tactics implemented for reservoir development and management. Reservoir development planning involves devising and/or selecting strong strategies and tactics that will yield favorable economic results over the long term.

Reservoir development planning may include making decisions regarding size, timing, and location of production platforms as well as subsequent expansions and connections, for example. Key decisions can involve the number, location, allocation to platforms, and timing of wells to be drilled and completed in each field. Post drilling decisions may include determining production rate allocations across multiple wells. Any one decision or action may have system-wide implications, for example propagating positive or negative impact across a petroleum operation or a reservoir. In view of the aforementioned aspects of reservoir development planning, which are only a representative few of the many decisions facing a manager of petroleum resources, one can appreciate the value and impact of planning.

Computer-based modeling holds significant potential for reservoir development planning, particularly when combined with advanced mathematical techniques. Computer-based planning tools support making good decisions. One type of planning tool includes methodology for identifying an optimal solution to a set of decisions based on processing various information inputs. For example, an exemplary optimization model may work towards finding solutions that yield the best outcome from known possibilities with a defined set of constraints. Accordingly, a petroleum operation may achieve great economic benefit via properly applying optimization models for optimizing the development plans and management of petroleum resources, particularly those involving decision-making for multiple oil or gas fields over a multiple years.

The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms can describe working towards a solution which may be the best available solution, a preferred solution, or a solution that offers a specific benefit within a range of constraints; or continually improving; or refining; or searching for a high point or a maximum for an objective; or processing to reduce a penalty function; etc.

In certain exemplary embodiments, an optimization model can be an algebraic system of functions and equations comprising (1) decision variables of either continuous or integer variety which may be limited to specific domain ranges, (2) constraint equations, which are based on input data (parameters) and the decision variables, that restrict activity of the variables within a specified set of conditions that define feasibility of the optimization problem being addressed, and/or (3) an objective function based on input data (parameters) and the decision variables being optimized, either by maximizing the objective function or minimizing the objective function. In some variations, optimization models may include non-differentiable, black-box and other non-algebraic functions or equations.

A typical (deterministic) mathematical optimization problem involves minimization or maximization of some objective function subject to a set of constraints on problem variables. This is commonly known as mathematical programming in the scientific and engineering community. Sub-categories of mathematical programming include linear programming (LP), mixed integer programming (MIP), non-linear programming (NLP), and mixed-integer nonlinear programming (MINLP). A deterministic optimization model is typically posed in the following form in which an objective function "f" is optimized subject to an array of constraint functions "g" that must be satisfied by setting the values of decision variable arrays "x" and "y". The constraint functions generally include a combination of known data parameters and unknown variable values when a mathematical programming model is posed.

$$\min f(x,y)$$

$$s.t. g(x,y) \le 0$$

Solving the problem to mathematical optimality can comprise finding values for the decision variables such that all constraints are satisfied, wherein it is essentially mathematically impossible to improve upon the value of the objective function by changing variable values while still remaining feasible with respect to all of the constraints. When some of the "known" fixed parameters of the problem are actually uncertain in practice, a common approach in decision-making is to ignore the uncertainty and model the problem as a deterministic optimization problem. However, the solution to the deterministic optimization problem may be sub-optimal, or possibly even infeasible, especially if the problem parameters take values that are ultimately different than those values chosen to be used as input into the optimization model that is solved.

The optimization process of reservoir development planning can be challenging, even under the assumption that the economics and behavior of reservoir and surface facilities are fully known. Typically, a large number of soft and hard constraints apply to an even larger number of decision variables. In practice, however, there exists uncertainty in reservoir behavior, economics, and/or other components of the decision process, which complicate the optimization process.

SUMMARY

Conventional reservoir development planning technologies generally fail to consider such uncertainty adequately. Uncertainty is ordinarily inherent in the information and factors pertinent to development planning. That is, the inputs to the optimization problem (and perhaps the mathematical modeling of the problem) contain uncertainty. Uncertainty can be viewed as characteristics or aspects that are nondeterministic or that otherwise remain unknown, a priori. Conventional approaches for applying computer programming for decision support in developing and managing petroleum resources do not take a sufficiently comprehensive view of such uncertainty.

Currently, considerations for uncertainty in reservoir behavior, economics, or other components of the decision process are typically reduced to a very limited number of cases, for example represented by a "high-side" case, a "most-likely" case, and a "low-side" case. For instance, the uncertainty in reservoir behavior is reduced to a known value, for each of the three cases mentioned above, by typically sampling random points within the uncertainty space. The term "uncertainty space," as used herein, generally refers to a representation of uncertainty relevant to a problem that is under solution, for example the collective uncertainties for data input to an optimization routine.

Based upon limited sampling of the uncertainty space, a value is assigned to the "high-side" case, the "most-likely" case, and the "low-side" case. Decisions are usually optimized for a specific case, usually the "most-likely" case, and subsequently evaluated for the remaining two cases to provide an acceptable level of risk. This approach, however, grossly underestimates the complexity of the uncertainty and can lead to a solution that is sub-optimal or that is less favorable than some other unidentified solution.

In view of the foregoing discussion, need is apparent in the art for an improved tool that can aid reservoir development planning and/or that can provide decision support in connection with reservoir development and resource management. A need further exists for a tool that can take a broad range of uncertainties into consideration for the plans or decision support. A need further exists for a tool that systematically addresses uncertain data within a model used to produce plans or decision support. A need further exists for a tool that can handle a full uncertainty space in connection with producing reservoir development plans or decision support. A need further exists for a tool in which inherent uncertainty in data is incorporated directly into the decision optimization model, so tradeoffs associated with decisions across various realizations of the uncertainty are captured and hence better information is available when making decisions regarding petroleum and/or natural gas reservoir development planning. The foregoing discussion of need in the art is intended to be representative rather than exhaustive. A technology addressing one or more such needs, or some other related shortcoming in the field, would benefit reservoir development planning, for example providing decisions or plans for developing and managing a reservoir more effectively and more profitably.

The present invention supports making decisions, plans, strategies, and/or tactics for developing and managing petroleum resources, such as a petroleum reservoir.

In one aspect of the present invention, a computer- or software-based method can provide decision support in connection with developing one or more petroleum reservoirs. For example, the method can produce a reservoir development plan based on input data relevant to the reservoir and/or to the operation. Such input data can comprise, unknown or ill-defined fluid dynamics, the size of the reservoir, the current state of development, current and projected prices of petroleum, drilling costs, cost per hour of rig time, geological data, the cost of capital, current and projected available resources (human, financial, equipment, etc.), and the regulatory environment, to name a few representative possibilities. The input data can have uncertainty. More specifically, each element of input data can have an associated level, amount, or indication of uncertainty. Some of the input data may be known with a high level of uncertainty, such as the current cost of rig time, while other input data may have various degrees of uncertainty. For example, uncertainty of future rig time cost may increase as the amount of time projected into the future increases. That is, the uncertainty of rig time cost for the fifth year of the development plan would likely be higher than the uncertainty of rig time cost for the second year. The collective uncertainties of the input data can define an uncertainty space. A software routine can produce the reservoir development plan via processing the input data and taking the uncertainty space into consideration, for example via applying a stochastic programming-based routine. Producing the reservoir development plan can comprise outputting some aspect of a plan, making a determination relevant to generating or changing a plan, or making a recommendation about one or more decisions relevant to reservoir development or management, for example.

In one general aspect, a method for reservoir development planning includes receiving data relevant of the reservoir or to reservoir development. The received data has an uncertainty associated therewith. The received data is processed via computer-implemented stochastic programming, including processing the received data with a stochastic programming model that incorporates the uncertainty. A reservoir development plan is generated in response to processing the received data via computer-implemented stochastic programming. The reservoir development plan is outputted to manage development of the reservoir.

Implementations of this aspect may include one or more of the following features. For example, the reservoir development plan may be generated according to an uncertainty space associated with the received data. The computer-implemented stochastic programming may include optimizing at least some aspect of the reservoir development plan based on the received data and an uncertainty space. Known data parameters and uncertain data parameters may be received, wherein processing the received data via the computer-implemented stochastic programming may include processing the data with a stochastic programming model that incorporates the uncertain data parameters. An uncertainty space may be associated with the received data. The received data may be processed via the computer-implemented stochastic programming which may include considering the uncertainty space via scenarios or samples. The computer-implemented stochastic programming may include a plurality of stages, each representing a step in time; a plurality of decision variables in each stage, with a set of variables representing a set of potential decisions to be made at the current stage in the reservoir development plan; and/or a plurality of probability distribution functions, each probability distribution function representing an uncertainty in the data, and in each stage some of the uncertainty in the data is resolved. Future decision variables may be determined from previous decision variables and the probability distribution functions for remaining uncertainty in the data. A decision-maker may be allowed to undertake one or more corrective decisions within the computer-implemented stochastic programming prior to completion of the optimization. The received data may include one or more of fluid dynamics of the reservoir, the size of the reservoir, a current state of reservoir development, a price of petroleum, a cost to drill into the reservoir, a cost of rig time for a rig to operate with the reservoir, and a capital cost relevant to drilling into or managing the reservoir.

In another general aspect, a method for hydrocarbon reservoir development planning includes receiving data representative of the hydrocarbon reservoir, wherein uncertainty is associated with the data. The received data may be processed with a computer-based stochastic programming model that incorporates uncertainty. At least some portion of a reservoir development plan may be produced in response to processing the received data with the computer-based stochastic programming model that incorporates the uncertainty. The reservoir development plan is outputted. The steps of processing, producing and outputting are repeated when the uncertainty is reduced.

Implementations of this aspect may include one or more of the following features. For example, incorporating the uncertainty in the computer-based stochastic programming model may include capturing tradeoffs across a plurality of realizations of the uncertainty. The step of producing at least some portion of the reservoir development plan in response to processing the received data with the computer-based stochastic programming model that incorporates the uncertainty may include achieving feasibility of an optimization problem across an entire uncertainty space. Uncertain data may be systemically processed within the stochastic programming model. The data may include one or more of fluid dynamics of the reservoir, the size of the reservoir, a current state of reservoir development, a price of petroleum, a cost to drill into the reservoir, a cost of rig time for a rig to operate with the reservoir, and a capital cost relevant to drilling or managing the reservoir.

In another general aspect, a method for decision support regarding development of petroleum resources includes receiving a plurality of data elements regarding a decision about developing a petroleum reservoir, wherein a respective characterization of uncertainty is associated with each of the data elements. A recommendation for the decision is output in response to processing each of the data elements and each of the respective characterizations of uncertainty with a computer-based stochastic programming model.

Implementations of this aspect may include one or more of the following features. For example, the stochastic programming model may incorporate each of the respective characterizations of uncertainty. Processing each of the data elements and each of the respective characterizations of uncertainty with the computer-based stochastic programming model may include covering an uncertainty space.

In another general aspect, a computer-based method of optimizing development planning for a hydrocarbon reservoir includes providing input data representative of the hydrocarbon reservoir, the input data having an uncertainty associated therewith. A first simulation of the reservoir is generated using a high fidelity model for reservoir or surface facility behavior utilizing the input data, wherein the first simulation generates first high fidelity output data. A low fidelity model for reservoir or surface facility behavior is generated using the input data and the first high fidelity output data, wherein the low fidelity model generates a prediction. A reservoir development planning model is optimized utilizing the input data and the low fidelity model for reservoir or surface facility behavior, wherein the reservoir development planning model generates reservoir development planning output data and the reservoir development planning model comprises a stochastic programming model that incorporates uncertainty. A second simulation of the reservoir is performed using the high fidelity model for reservoir or surface facility behavior utilizing the input data and the reservoir development planning output data, wherein the second simulation generates second high fidelity output data. The second high fidelity output data is compared with the prediction of the low fidelity model. The steps of generating a low fidelity model for reservoir or surface facility behavior, optimizing a reservoir development planning model, performing a second simulation of the reservoir using the high fidelity model for reservoir or surface facility behavior, and comparing the second high fidelity output data with the prediction of the low fidelity model are repeated until the second high fidelity output data is substantially consistent with the prediction of the low fidelity model.

Implementations of this aspect may include one or more of the following features. For example, a development plan is generated in response to the second high fidelity output data being substantially consistent with the prediction of the low fidelity model. A solution routine, interfacing with the stochastic programming model, may assist the stochastic programming model to optimize development planning for the reservoir. The stochastic programming model may include a solution routine for assisting with optimizing development planning for the reservoir. The input data may include one or more of fluid dynamics of the reservoir, the size of the reservoir, a current state of reservoir development, a price of petroleum, a cost to drill into the reservoir, a cost of rig time for a rig to operate with the reservoir, and a capital cost relevant to drilling or managing the reservoir.

In another general aspect, a method of producing hydrocarbons from a subterranean reservoir may include generating a reservoir development planning system based on input data representative of the reservoir. The reservoir development planning system is optimized via a stochastic programming model and according to an uncertainty space. Hydrocarbons are produced from the reservoir according to output from the optimized reservoir development planning system.

Implementations of this aspect may include one or more of the following features. For example, the input data may include deterministic components and nondeterministic components. Each of the nondeterministic components may be considered with the stochastic programming model. The stochastic programming model may incorporate uncertainty of the input data. The uncertainty space may specify inherent uncertainty of the input data. The reservoir development planning system may include the stochastic programming model which includes a low fidelity reservoir model, and a high fidelity reservoir model. The high fidelity model accepts one or more parameter input data from the stochastic programming model and provides one or more reservoir or surface facility property input data to the stochastic programming model. The reservoir development planning system may be optimized by simulating operation of the reservoir using a high fidelity model; and simulating operation of the reservoir using a low fidelity model. The input data includes one or more of fluid dynamics of the reservoir, the size of the reservoir, a current state of reservoir development, a price of petroleum, a cost to drill into the reservoir, a cost of rig time for a rig to operate with the reservoir, and a capital cost relevant to drilling or managing the reservoir.

In another general aspect, a method of producing hydrocarbons from a subterranean reservoir may include generating a reservoir development planning system based on input data representative of the reservoir. The reservoir development planning system is optimized via a stochastic programming model and according to an uncertainty space. Hydrocarbons are produced from the reservoir according to output from the optimized reservoir development planning system.

In another general aspect, a computer program product has computer executable logic recorded on a tangible computer readable medium. The computer program product includes code for receiving data representative of the reservoir, the received data having an uncertainty associated therewith, code for processing the received data via computer-implemented stochastic programming, including processing the received data with a stochastic programming model that incorporates the uncertainty, code for generating a reservoir development plan in response to processing the received data via computer implemented stochastic programming, code for outputting the reservoir development plan to manage development of the reservoir.

The discussion of decision support tools for reservoir development presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
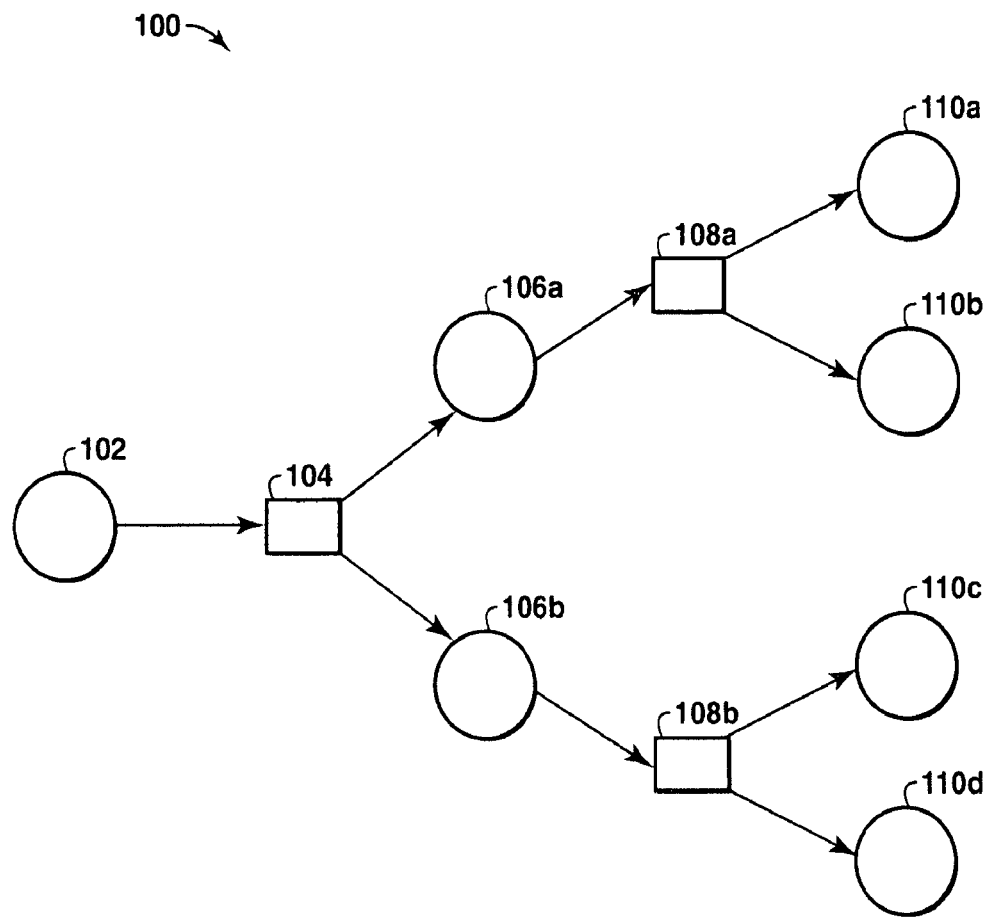
FIG. 1 is an illustration of a multistage stochastic programming decision tree representing uncertainty associated with data for a reservoir model resolved in several steps and the resolution of the uncertainty over time in accordance with certain exemplary embodiments of the present invention.

Many aspects of the present invention can be better understood with reference to the above drawings. The elements and features shown in the drawings are not necessarily to scale, emphasis instead being placed upon clearly illustrating principles of exemplary embodiments of the present invention. Moreover, certain dimensions may be exaggerated to help visually convey such principles. In the drawings, reference numerals designate like or corresponding, but not necessarily identical, elements throughout the several views.

DETAILED DESCRIPTION OF THE EXEMPLARY EMBODIMENTS

Exemplary embodiments of the present invention support making decisions regarding reservoir development planning while details of uncertain parameters remain unknown. Uncertain parameters unfold over time and decisions may need to be made at regular intervals while incorporating the available information in the decision process. These uncertainties and their evolution over time can be considered directly within an optimization model, such as a stochastic programming framework, or model. In an exemplary embodiment, the stochastic programming model systematically addresses all the uncertain data and its evolution over time. The stochastic programming model not only incorporates the uncertainty representation in the optimization model and evaluates solution performance explicitly over all scenarios, it also incorporates the flexibility that the decision-maker has in the real world to adjust decisions based on new information obtained over time. The decision-maker will be able to make corrective decisions/actions based upon this new information. Such a paradigm allows for producing flexible or robust solutions that remain feasible covering the uncertainty space, as well as making the trade-off between optimality and the randomness or uncertainty in the input data to reflect the risk attitude of a decision-maker.

In certain exemplary embodiments, stochastic programming provides an approach to reservoir development planning and handles uncertainty effectively. In some embodiments, the framework may be analogous to a robust optimization model. However, the penalty function in the objective may replace a feasibility for all realizations deemed possible, sometime referred to as "scenarios." One exemplary embodiment of stochastic programming takes advantage of the property that probability distributions governing reservoir development planning data are usually either known or can be estimated. In some embodiments, the stochastic programming model may be utilized to find a policy that is feasible for all, or nearly all, the possible data instances, as well as that maximizes the expectation of some function of the decisions and random variables.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

An exemplary embodiment of the present invention will now be described in detail with reference to FIGS. 1-4. FIG. 1 is an illustration showing a multistage stochastic programming decision tree 100 representing uncertainty associated with data for a reservoir model resolved in several steps and the resolution of the uncertainty over time in accordance with certain exemplary embodiments of the present invention. The decision tree 100 illustrates a scenario tree with three years and four scenarios. A decision 102 is made at a time T1 based on the information available at the time T1. At a stage 104, uncertainty in some uncertain quantities, for instance oil price, are resolved and a group of decisions 106a, 106b are implemented based on the information available at a time T2. At stage 108a, 108b, uncertainty in uncertain quantities are again resolved and a group of decisions 110a, 110b, 110c, 110d are implemented based on the information available at a time T3.

The application of a multistage stochastic programming framework under uncertainty may include long term planning of investment, production, or development, in which fixed decisions occur in stages over time. Therefore, opportunities are created to consider more definite information as time passes. Decisions in the model may also include decisions that correspond to actions that may recover information about the uncertainties. Recourse embedded in the multistage stochastic programming model allows for the decision-maker to adjust their decisions, or undertake corrective actions, based on the information obtained. As used herein, the term "recourse" refers to the ability to take corrective action after a random event has taken place. With recourse leading to robust, flexible, higher value decisions and a realistic model of decision-making in the real world, the stochastic programming model can provide solutions that are more optimal. In some embodiments, the stochastic programming model may further include the addition of probabilistic or chance constraints, expected value constraints, and/or measures of risk in the objective of the optimization model.

Figure 2:
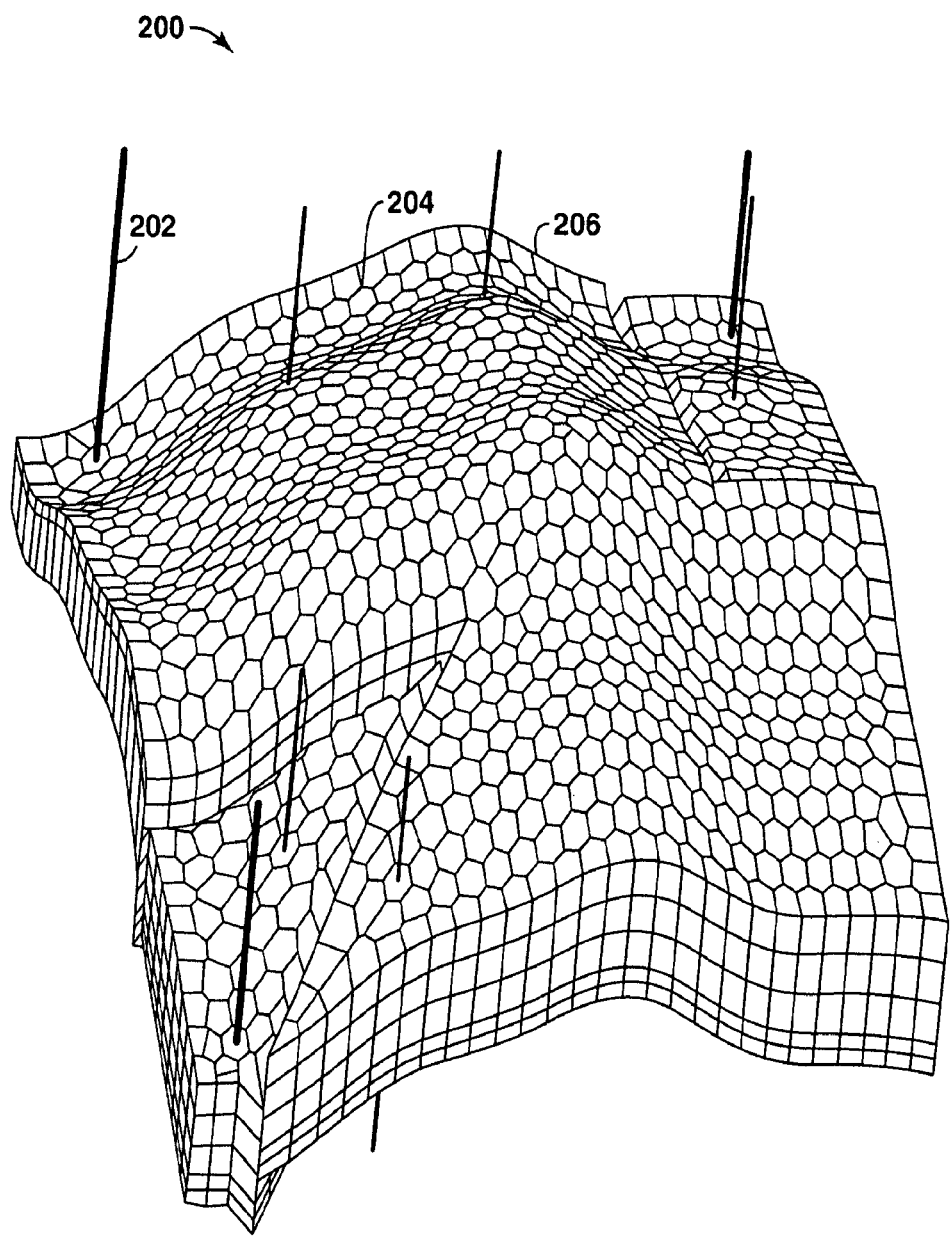
FIG. 2 is an illustration of a three-dimensional reservoir model including a grid mesh that defines a plurality of nodes in accordance with certain exemplary embodiments of the present invention.

FIG. 2 is an illustration of a three-dimensional reservoir model 200 including a grid mesh 206 that defines a plurality of nodes 204 in accordance with certain exemplary embodiments of the present invention. The reservoir model 200 may be used for simulating operation of an oil and/or gas reservoir with one or more vertical wells 202. As shown, the reservoir model 200 may be broken up into a plurality of nodes 204 by a grid mesh 206. The grid mesh 206 represents geological formation in cell format to support computer-based processing of reservoir and geological information according to the grid mesh 206. The nodes 204 of the reservoir model 200 may be of non-uniform size. This three-dimensional reservoir model 200 may provide additional data to be used in conjunction with a reservoir simulator.

Figure 3:
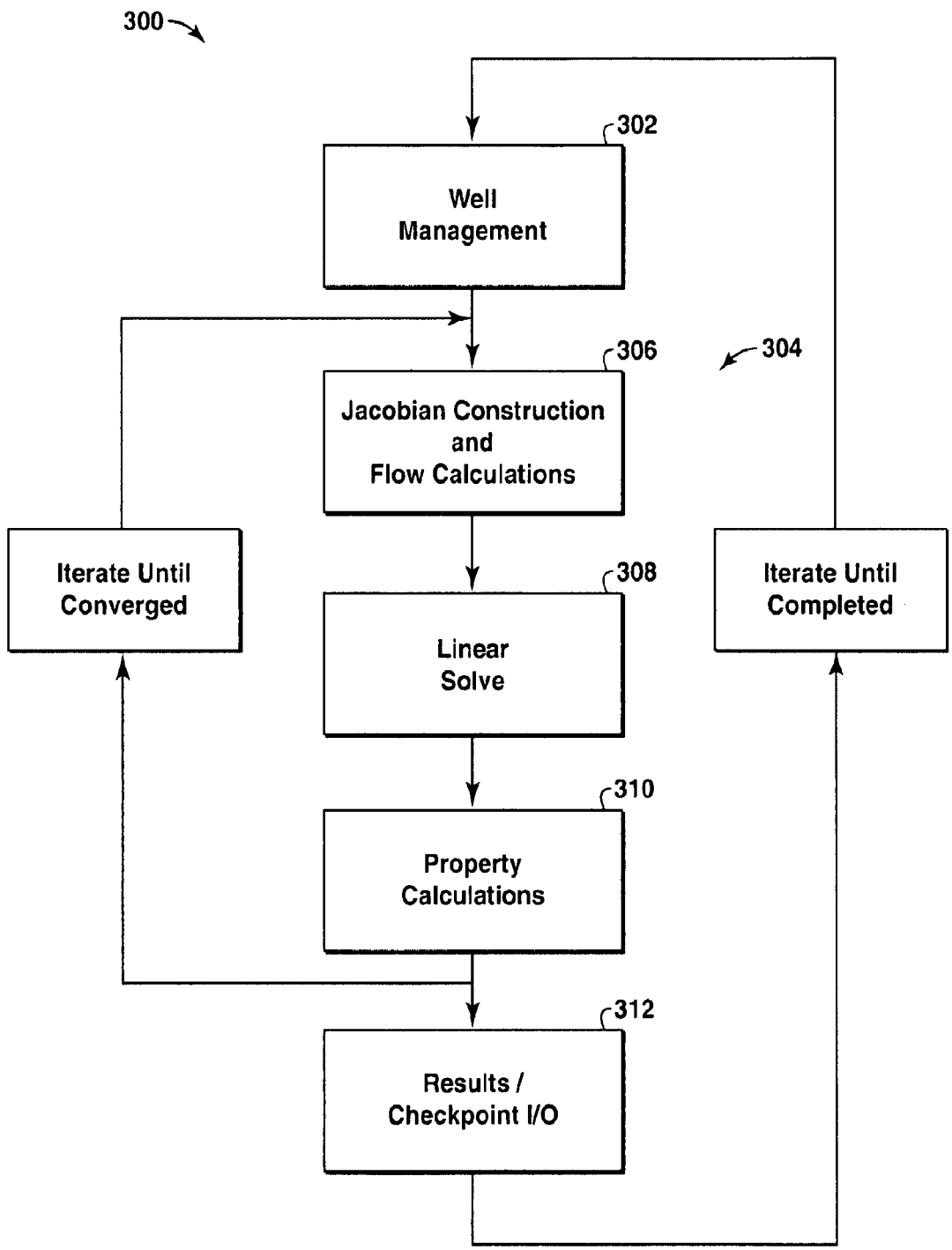
FIG. 3 is a flowchart illustration of a reservoir simulator for simulating the operation of the reservoir model of FIG. 2 in accordance with certain exemplary embodiments of the present invention.

FIG. 3 is a flowchart illustration of a reservoir simulator 300 for simulating the operation of the reservoir model 200 of FIG. 2 in accordance with certain exemplary embodiments of the present invention. In an exemplary embodiment, the simulator 300 comprises a set of instructions executing on a computer system. That is, the simulator 300 comprises one or more software programs running on one or more computers. Additionally, the computer may have one or more processors performing the simulation.

Referring to FIG. 2 and FIG. 3, the reservoir simulator 300 simulates the reservoir model's operation in which well management 302 is performed for the well 202 and surface facility network of the reservoir model 200. The well management 302 is performed over all wells 202 in the reservoir model 200 and includes an iterative process 304 in which a Jacobian construction and flow calculation 306 is performed, followed by a linear solve 308 and one or more property calculations 310. The linear solve 308 and/or the one or more property calculations 310 are performed over large arrays of data that represent properties such as, for example, pressure and composition at mesh points in the grid mesh 206.

Upon the completion and convergence of the iterative process 304 for the well 202 in the reservoir model 200, the data for the well 202 is then generated in a results/checkpoint I/O 312. Upon completion of the well management 302 for the well 202, the well management 302 may be performed for the remaining wells 202 of the entire reservoir model 200, wherein the results of each well 202 are generated in the results/checkpoint I/O 312.

The reservoir simulator 300 may be implemented, for example, using one or more general purpose computers, special purpose computers, analog processors, digital processors, central processing units, and/or distributed computing systems. That is, the reservoir simulator 300 can comprise computer executable instructions or code.

The output of the reservoir simulator 300 can comprise a result displayed on a graphical user interface (GUI), a data file, data on a medium such as an optical or magnetic disk, a paper report, or signals transmitted to another computer or another software routine (not an exhaustive list).

The reservoir model 200 and reservoir simulator 300 may be used to simulate the operation of the reservoir to thereby permit modeling of fluids, energy, and/or gases flowing in the hydrocarbon reservoirs, wells, and related surface facilities. Reservoir simulation 300 is one part of reservoir optimization which also includes constructing the data to accurately represent the reservoir. An exemplary simulation goal comprises understanding formation flow patterns in order to optimize some strategy for producing hydrocarbons from some set of wells 202 and surface facilities. The simulation is usually part of a time-consuming, iterative process to reduce uncertainty about a particular reservoir model description while optimizing a production strategy. Reservoir simulation, for example, is one kind of computational fluid dynamics simulation.

The reservoir model 200 and the reservoir simulator 300 may further be used to optimize the design and operation of the corresponding reservoir, wells, and related surface facilities.

Figure 4:
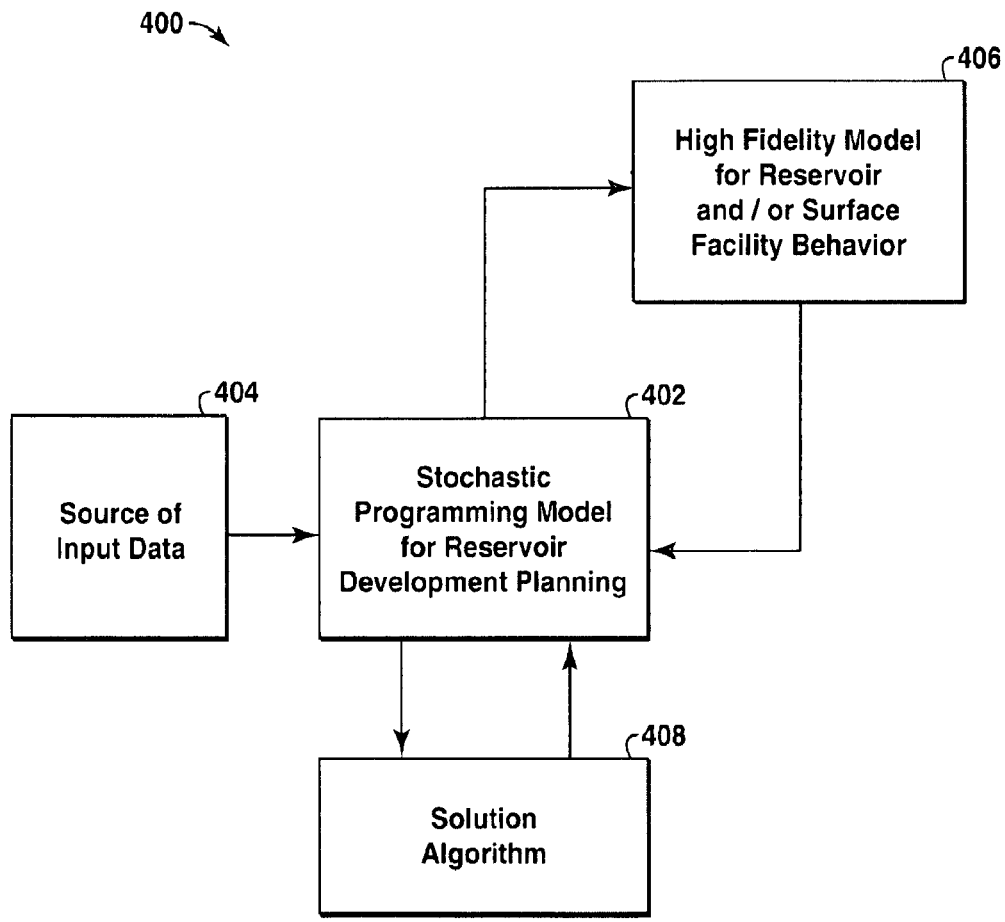
FIG. 4 is a schematic illustration of a stochastic programming-based reservoir development planning system in accordance with certain exemplary embodiments of the present invention.

FIG. 4 is a schematic illustration of a stochastic programming-based reservoir development planning system 400 in accordance with certain exemplary embodiments of the present invention. In an exemplary embodiment, the reservoir development planning system 400 is a computer program, a software-based engine, or a computing module. Moreover, each illustrated block in the diagram of FIG. 4 can comprise a computer program, a software-based engine, or a computing module. Thus, the stochastic programming-based reservoir development planning system 400 may be implemented, for example, using one or more general purpose computers, special purpose computers, analog processors, digital processors, central processing units, and/or distributed computing systems.

The stochastic programming-based reservoir development planning system 400 includes one or more stochastic programming models for reservoir development planning 402. The stochastic programming model for reservoir development planning 402 is a stochastic programming framework for optimizing the development plan given some target objective and subject to the constraints of the system.

Additionally, the stochastic programming-based reservoir development planning system 400 may include at least one source of input data 404, a high fidelity model for reservoir and/or surface facility behavior 406 and a solution routine 408. The high fidelity model for reservoir and/or surface facility behavior 406 is a high fidelity model, or reservoir simulation model, or a collection of reservoir simulation models where each element in the collection represents one possible realization of the uncertainty space. The high-fidelity model could also be just one reservoir simulation model that encapsulates the uncertainty. The high-fidelity model is used to update and adjust the stochastic programming model for reservoir development planning 402 in subsequent iterations. Such updates and adjustments provide refinement as the stochastic programming model for reservoir development planning 402 may contain an approximation of the high fidelity model for reservoir and/or surface facility behavior 406 within its system of constraint equations. A low fidelity model, which is included within the stochastic programming model for reservoir development planning 402, provides this approximation of the high fidelity model for reservoir and/or surface facility behavior 406. Similar to the case of the high-fidelity model, the low fidelity model could be a collection of individual low-fidelity models, such that each element is a simplification of an element in the collection of high-fidelity models. Alternatively, the low fidelity model could exist as an individual model that encapsulates the uncertainty. Although two forms have been enumerated in the exemplary embodiment for each of the high fidelity model and the low fidelity model, additional forms and combinations are contemplated for each of these models without departing from the scope and spirit of the exemplary embodiment.

The stochastic programming model for reservoir development planning 402 may receive input data from a source of input data 404. The input data can comprise data entries in one or more spreadsheets, one or more databases, information fed over a computer network or the Internet, manual entries, user input from a GUI, etc.

After processing the input data, the stochastic programming model for reservoir development planning 402 may provide output to a high fidelity model for reservoir and/or surface facility behavior 406 of the reservoir under consideration. The high fidelity model for reservoir and/or surface facility behavior 406 may in turn provide its output data back to the stochastic programming model for reservoir development planning 402. Finally, the stochastic programming model for reservoir development planning 402 may interface with the solution routine 408.

The present exemplary embodiment provides a stochastic programming-based reservoir development planning system 400 in which the inherent uncertainty in the data associated with a reservoir, the resolution of uncertainty over time, and the implementation of corrective decisions based on information available at that time is incorporated directly into the stochastic programming model for reservoir development planning 402. By incorporating the uncertainty in the data into the stochastic programming model for reservoir development planning 402 and resolving the uncertainty at each time point, tradeoffs associated with decisions across various realizations of the uncertainty are captured and hence better information is available when making decisions regarding petroleum and/or natural gas reservoir development planning.

Generally, the stochastic programming model may be formulated, solved analytically or numerically, and analyzed in order to provide useful information to the decision-maker. In some exemplary embodiments, the stochastic programming model is a two-stage model or linear program, which is a particular embodiment of the multistage stochastic programming model. In such embodiments, the decision-maker takes some action during a first stage, after which a random event occurs affecting the outcome of the first stage decision. Thereafter, a recourse decision can be made in a second stage that compensates for any negative effects that may have been experienced as a result of the first stage decision. The aim of the two-stage stochastic programming model is to optimize the expected value of the objective function subject to constraints with the uncertainty resolving at one point in the time horizon. The optimal policy from such a model is a single first stage policy and a collection of recourse decisions, sometimes referred to "a decision rule", defining which second stage action should be taken in response to each random outcome. Two mathematical formulations for a two-stage model are as follows:

$$\min E_\theta[f(x, y; \theta] \to \min \sum_s p_s f(x, y_s; \theta_s) s \in \{samples/scenarios\}$$

$$\text{s.t. } g(x, y; \theta) \le 0 \text{ s.t. } g(x, y; \theta_s) \le 0$$

According to an exemplary embodiment, the application of the two-stage stochastic programming model may be in chemical process design. Uncertainty may occur in the exact composition, properties, and amount of raw materials. First stage decisions may include design decisions such as the type of process units to be installed and the design specifications of the selected units. Second stage decisions may include operations decisions, for instance, flow rates and temperatures that may be controlled to adjust to specific realizations of the random or uncertain data.

In an exemplary embodiment, the stochastic programming-based reservoir development planning system 400 provides a decision support tool to optimize a risk averse, risk neutral, or risk seeking measure of the objective function (for instance, net present value –NPV) satisfying all business problem constraints.

In an exemplary embodiment, the stochastic programming model for reservoir development planning 402 may be a data independent mathematical abstraction of the reservoir model 200 (FIG. 2). The source of input data 404 may provide reservoir data which may, for example, be stored and retrieved from spreadsheets, databases, manual entry, or otherwise. The high fidelity model for reservoir and/or surface facility behavior 406 may include one or more reservoir or surface facility simulators such as, for example, the reservoir simulator 300 can comprise or be based upon software-based tools, programs, or capabilities; such as those marketed by: (1) Schlumberger Technology Corporation under the registered trademark "ECLIPSE", (2) Landmark Graphics Corporation under the registered trademark "VIP", or (3) Landmark Graphics Corporation under the registered trademark "NEXUS". Also, the solution routine 408 may comprise one or more routines, methods, processes, or algorithms for determining behavior of the stochastic programming model 402.

In an exemplary embodiment, the design and operation of the stochastic programming model for reservoir development planning 402 and the solution routine 408 may be combined in whole or in part. Additionally, the design and operation of the stochastic programming-based reservoir development planning system 400 may be implemented, for example, using one or more general purpose programmable computers which may, or may not, be distributed within or between one or more communication networks.

Figure 5:
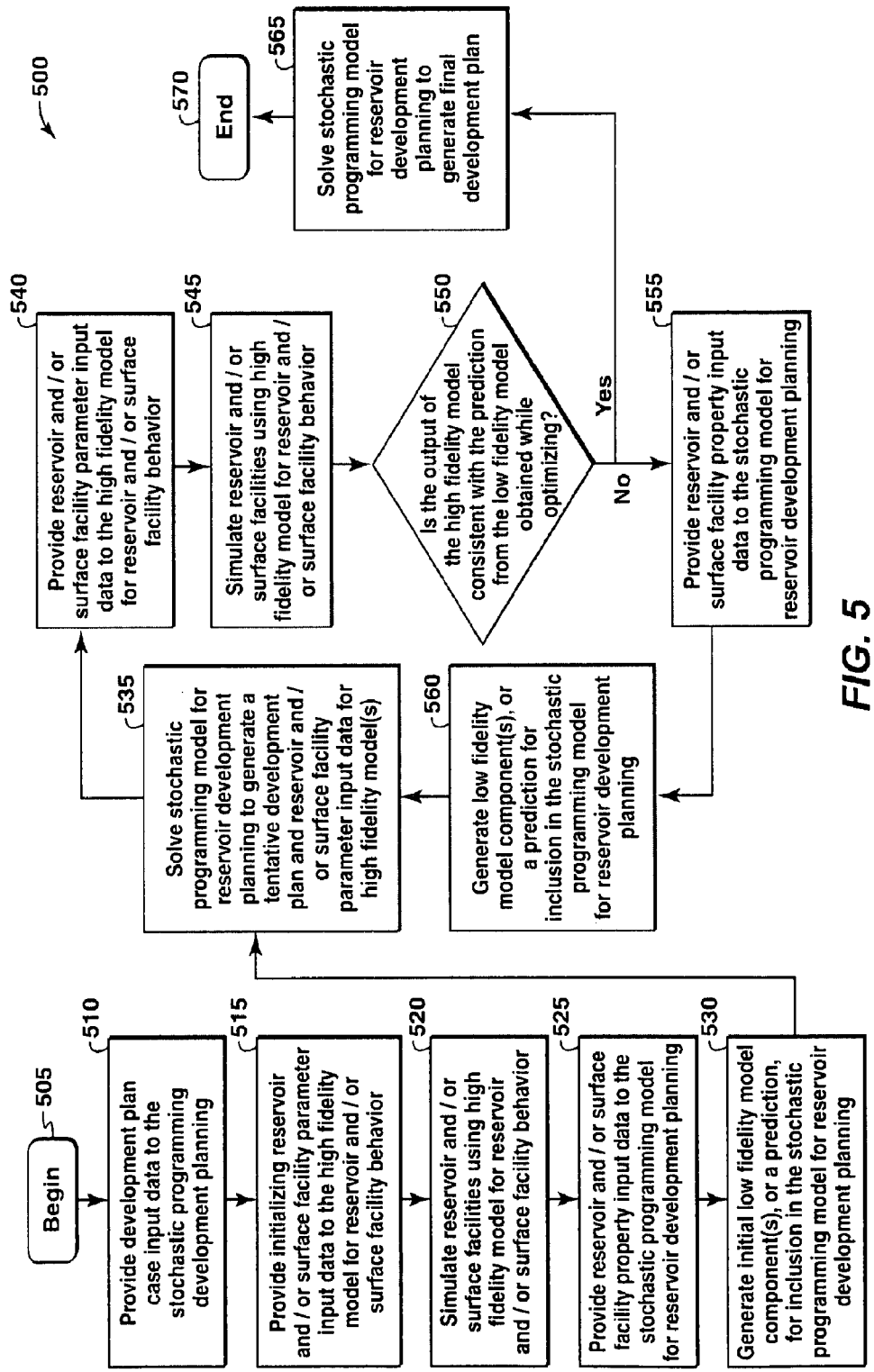
FIG. 5 is a flowchart illustration of a method for operating the stochastic programming-based reservoir development planning system of FIG. 4 in accordance with certain exemplary embodiments of the present invention.

FIG. 5 is a flowchart illustration of a method 500 for operating the stochastic programming-based reservoir development planning system of FIG. 4 in accordance with an exemplary embodiment.

Certain steps in the methods and processes described herein (with reference to FIG. 5 as well as the other figures) must naturally precede others for the present invention to function as described. However, the present invention is not limited to the order of the steps described if such order or sequence does not adversely alter the functionality of the present invention. That is, it is recognized that some steps may be performed before or after other steps or in parallel with other steps without departing from the scope and spirit of the present invention.

The present invention can include multiple processes that can be implemented with computer and/or manual operation. The present invention can comprise one or more computer programs that embody certain functions described herein and illustrated in the examples, diagrams, figures, and flowcharts. However, it should be apparent that there could be many different ways of implementing aspects of the present invention with computer programming, manually, non-computer-based machines, or in a combination of computer and manual implementation. The invention should not be construed as limited to any one set of computer program instructions. Further, a programmer with ordinary skill would be able to write such computer programs without difficulty or undue experimentation based on the disclosure and teaching presented herein.

Therefore, disclosure of a particular set of program code instructions is not considered necessary for an adequate understanding of how to make and use the present invention. The inventive functionality of any programming aspects of the present invention will be explained in further detail in the following description in conjunction with the figures illustrating the functions and program flow and processes.

Referring to FIG. 5, the method of operation 500, which will be discussed with exemplary reference to FIGS. 1, 2, 3 and 4, begins at step 505 and proceeds to step 510. At step 510 the development plan case input data is provided to the stochastic programming model for reservoir development planning 402. The input data may be provided from a combination of manual data entry, spreadsheets, and databases and may include, but is not limited to, specifications of uncertain parameters (e.g., range of uncertain values), decision variables (e.g., time when they will be implemented), risk attitude, objective function, etc. These input data may form a data instance that is used to populate one or more mathematical models within the stochastic programming model for reservoir development planning 402.

At step 515, the initializing reservoir and/or surface facility parameter input data is provided to the high fidelity model for reservoir and/or surface facility behavior 406. At step 520, the high fidelity model for reservoir and/or surface facility behavior 406 simulates the reservoir and/or surface facilities. This high fidelity model for reservoir and/or surface facility behavior 406 may include one or more high fidelity models for reservoir and surface facility behavior such as, for example, reservoir and facility simulators as discussed above. Additionally, upon performing the simulation, data relating to the operation of the reservoir and surface facilities are obtained, wherein the data includes, but is not limited to, production estimates, structure, flow properties, etc.

At step 525, the simulation results of the reservoir and/or surface facility property are provided as reservoir and/or surface facility property input data, which may also be referred to as first high fidelity output data, to the stochastic programming model for reservoir development planning.

At step 530, the initial low fidelity model components are generated for inclusion in the stochastic programming model for reservoir development planning 402. The initial low fidelity model components are a prediction for the reservoir and/or surface facility behavior. This prediction is generated from using the input data and the first high fidelity output data. The stochastic programming model for reservoir development planning 402 includes a low fidelity model that is computationally efficient and provides an approximation of the reservoir and surface facility behavior. In other words, as compared to the high fidelity model, the low fidelity model provides less computational precision to produce relatively rough results and thus executes much faster on a typical computing system. The low fidelity model may be generated from a portion of the software code used in the high fidelity model for reservoir and/or surface facility behavior 406. For example, the software of high fidelity model can be tuned so as to run fewer iterations. The high fidelity model can be adapted or configured to provide the low fidelity model via running two dimensional cross sections, via reducing the number of parameter inputs, via specifying larger cell sizes, etc.

Upon completion of steps 505 to 530, the stochastic programming model for reservoir development planning 402 is solved at step 535, utilizing the input data and the low fidelity model for reservoir and/or surface facility behavior. The stochastic programming model for reservoir development planning 402 includes one or more stochastic programming models that may, for example, include a MINLP-class model and a MINLP-based solution routine or algorithm.

The stochastic programming model for reservoir development planning 402 can be solved using one or more fit-for-purpose solution routines that may be provided in the one or more of the stochastic programming model for reservoir development planning 402 and the solution routine 408. The fit-for-purpose solution routines may include a combination of commercial or openly available mathematical programming solver routines and specially designed model-specific techniques. Thus, solving the stochastic programming model for reservoir development planning 402 can be achieved without probability density functions for the uncertainty representation. The solving of the stochastic programming model for reservoir development 403 planning generates a reservoir model solution, wherein a tentative development plan and reservoir and/or surface facility parameter input data, which may also be referred to as reservoir development planning output data, for the high fidelity model for reservoir and/or surface facility behavior 406 may be generated based on this reservoir model solution.

At step 540, the reservoir and/or surface facility parameter input data, generated by the solving of the stochastic programming model for reservoir development planning 402, is provided to the high fidelity model for reservoir and/or surface facility behavior 406.

At step 545, the high fidelity model for reservoir and/or surface facility behavior 406 again simulates the reservoir and/or surface facilities. This simulation generates a corresponding high fidelity output data, which may also be referred to as the reservoir and/or surface facility property input data.

At step 550, a determination is made as to whether the output of the high fidelity model is substantially consistent with the prediction from the low fidelity model. If the components are not substantially consistent, the reservoir and/or surface facility property input data is again provided to the stochastic programming model for reservoir development planning 402 at step 555. At step 560, the low fidelity model components are again generated for inclusion into the stochastic programming model for reservoir development planning.

At step 535, the stochastic programming model for reservoir development planning 402 is again solved. This process continues to iterate until the output of the high fidelity model is substantially consistent with the prediction from the low fidelity model at step 550. For example, when the results of the low fidelity model and the high fidelity model converge, step 550 can make a determination that a sufficient level of processing has been completed. At that point, step 550 deems the iterating complete.

Once the prediction from the low fidelity model is consistent with the output of the high fidelity model for reservoir and/or surface facility behavior 406, the stochastic programming model for reservoir development planning 402 is again solved to generate an output which may include a final development plan at step 565. The output may be used to generate reports, calculations, tables, figures, charts, etc. for the analysis of development planning or reservoir management under data uncertainty. Moreover exemplary embodiments of the output comprise, a result displayed on a graphical user interface (GUI), a data file, data on a medium such as an optical or magnetic disk, a paper report, or signals transmitted to another computer or another software routine, or some other tangible output to name a few examples.

According to some embodiments, multiple cases may be tested and optimized so that their results may be compared side-by-side as part of the process. The method of operation 500 then ends at step 570. Although the method of operation 500 has been illustrated in steps, some of the steps may be performed in a different order without departing from the scope and spirit of the exemplary embodiment.

In various exemplary embodiments, the method 500 can be implemented using a mathematical programming language or system such as, for example, AIMMS, GAMS, AMPL, OPL, Mosel or using a computer programming language such as, for example, C++ or Java, or some combination of both. The fit-for-purpose solution routines may be developed in either mathematical programming languages or directly with a computer programming language or with support of commercially available software tools. For example, commercial and open source versions of mathematical programming languages and computer programming code compilers are generally available.

To facilitate a better understanding of the present invention, the following example of certain aspects of some embodiments are given. In no way should the following example be read to limit, or define, the scope of the invention.

EXAMPLE

The present example is based on hypothetical inputs and the results and outcome are produced via executing a computer-based stochastic programming routine.

An asset with five oil fields (A, B, C, D and E) is considered. Planned development for these oil fields includes potential installation of three Floating Production, Storage and Offloading vessels (FPSOs), P1, P2, P3. A schedule for the decision to install or expand an FPSO and for the time when they will be available for production is created. Fields A, B will start production in year 1 and feed in to platform P1. Field C will start production in year 7 and can feed in to platform P1 or P2. Platform P2 will not be installed if field C feeds into P1. Fields D and E will start production in years 8 and 9, respectively, and can feed in to platform P1, P2 or P3. If needed, platforms P1, P2 and P3 can be expanded after installation. In this example, only oil development is considered and the lease expires in 15 years.

The FPSOs are available in capacities of 150, 225 and 300 thousands of stock tank barrels per day (kSTB/d). The FPSO capacities may be expanded in increments of 25, 50 and 75 kSTB/d such the total capacity of an FPSO does not exceed 300 kSTB/d.

The decisions to be made include (i) oil handling capacities and subsequent expansions for platforms P1, P2 and P3 (it is assumed that platform P1 is installed instantaneously at the beginning of year 1), (ii) which field will produce from which platform, and (iii) production rates over time for each field such that reservoir and capacity constraints are met.

Reservoir behavior for all fields is determined that relates field deliverability (kSTB/d) to cumulative oil production from the field. For this study, piecewise linear curves with initial build-up, plateau and decline phases are used.

Figure 6:
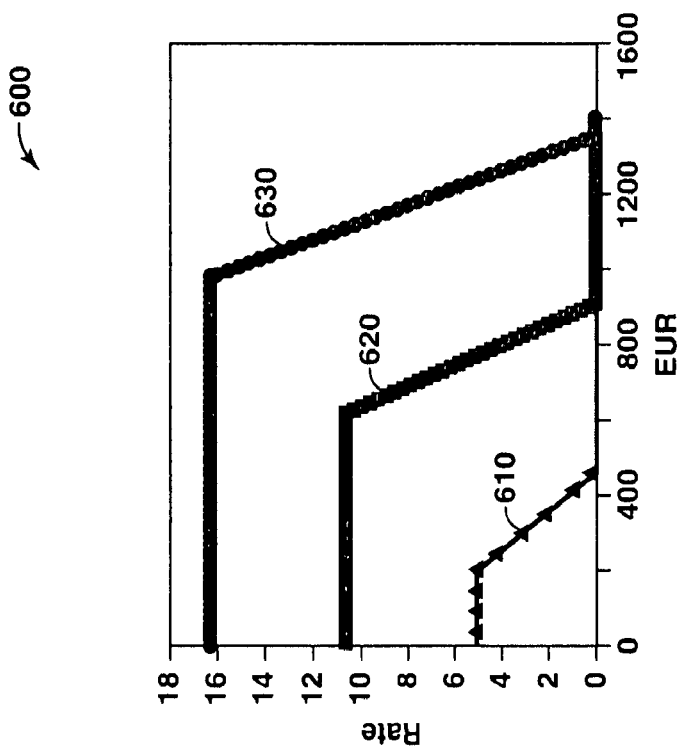
FIG. 6 is a graph representing the production profiles for three possible scenarios for a field A of the Example in accordance with an exemplary embodiment.

FIG. 6 is a graph representing the production profiles 600 for three possible oil production scenarios, a low scenario oil rate 610, a base scenario oil rate 620, and a high scenario oil rate 630, for field A in accordance with an exemplary embodiment.

Figure 7:
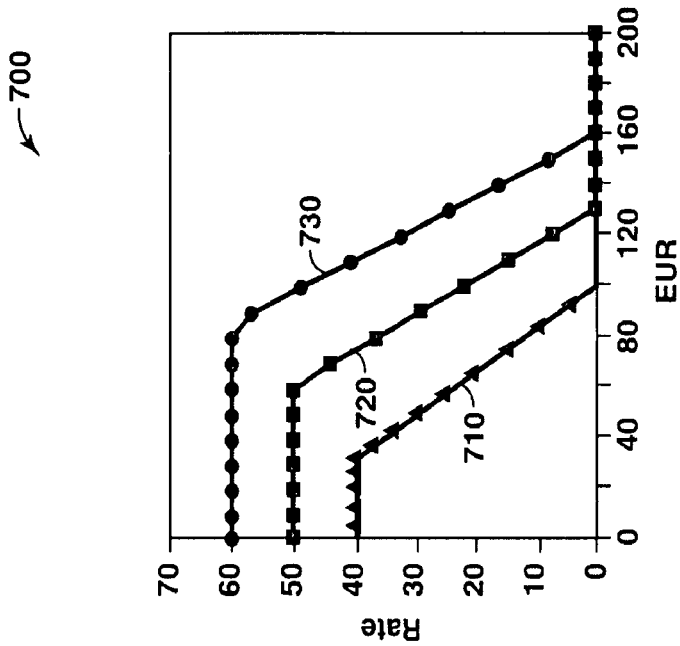
FIG. 7 is a graph representing the production profiles for three possible scenarios for a field B of the Example in accordance with an exemplary embodiment.

FIG. 7 is a graph representing the production profiles 700 for three possible oil production scenarios, a low scenario oil rate 710, a base scenario oil rate 720, and a high scenario oil rate 730, for field B in accordance with an exemplary embodiment.

Figure 8:
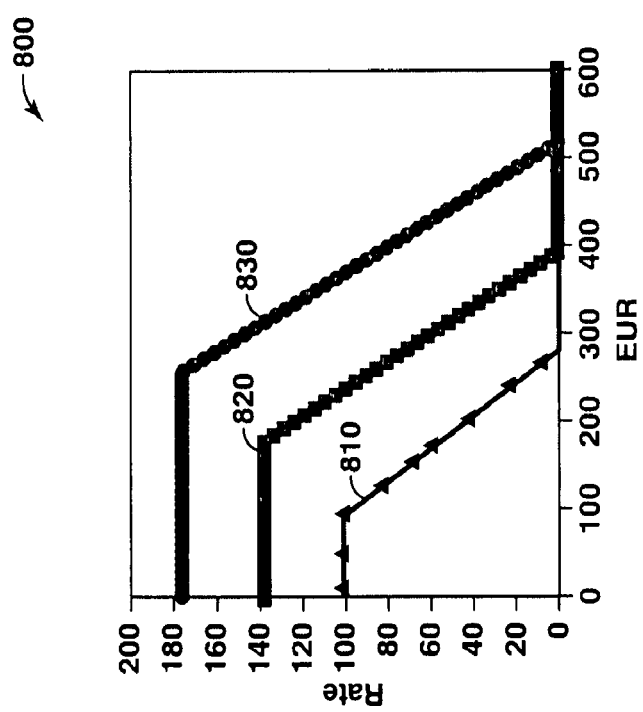
FIG. 8 is a graph representing the production profiles for three possible scenarios for a field C of the Example in accordance with an exemplary embodiment.

FIG. 8 is a graph representing the production profiles 800 for three possible oil production scenarios, a low scenario oil rate 810, a base scenario oil rate 820, and a high scenario oil rate 830, for field C in accordance with an exemplary embodiment.

Figure 9:
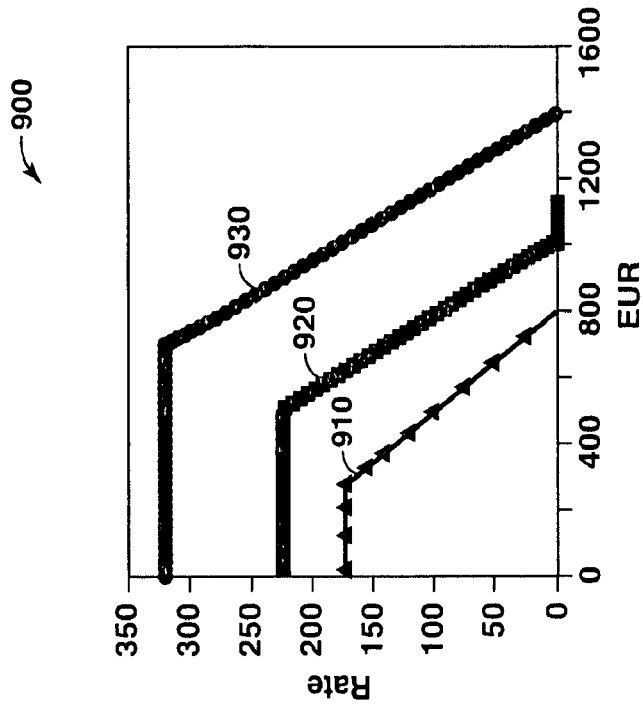
FIG. 9 is a graph representing the production profiles for three possible scenarios for a field D of the Example in accordance with an exemplary embodiment.

FIG. 9 is a graph representing the production profiles 900 for three possible oil production scenarios, a low scenario oil rate 910, a base scenario oil rate 920, and a high scenario oil rate 930, for field D in accordance with an exemplary embodiment.

Figure 10:
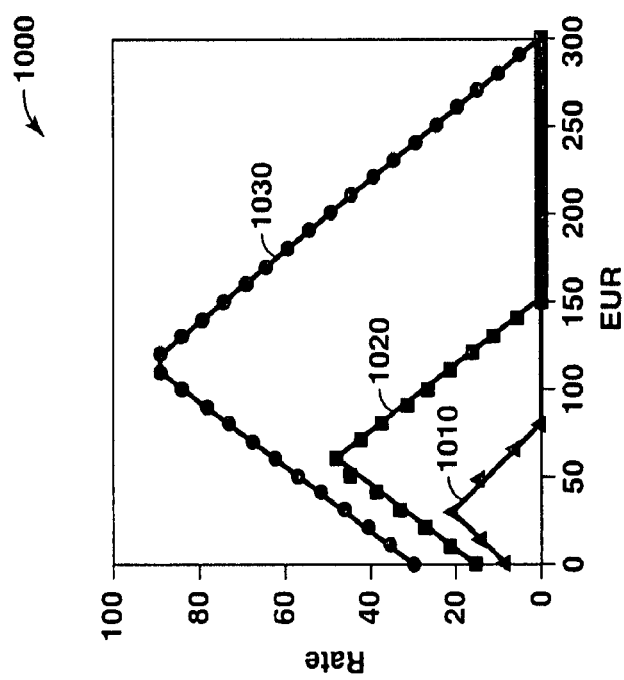
FIG. 10 is a graph representing the production profiles for three possible scenarios for a field E of the Example in accordance with an exemplary embodiment.

FIG. 10 is a graph representing the production profiles 1000 for three possible oil production scenarios, a low scenario oil rate 1010, a base scenario oil rate 1020, and a high scenario oil rate 1030, for field E in accordance with an exemplary embodiment.

Figure 11:
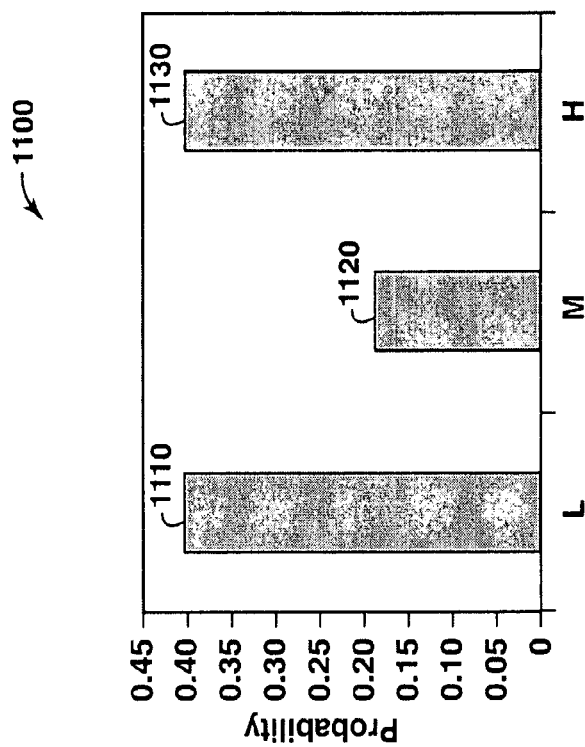
FIG. 11 is a graph representing an initial probability distribution for the uncertain production profile for the field A of the Example in accordance with an exemplary embodiment.
Figure 12:
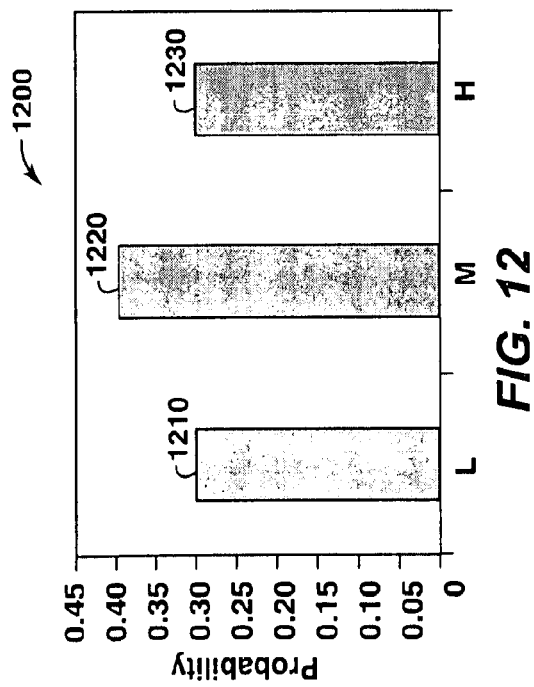
FIG. 12 is a graph representing the probability distribution for the uncertain production profile for the fields B, C, D, E of the Example in accordance with an exemplary embodiment.

Uncertainty in reservoir behavior for all fields is also considered. The uncertainty is represented using a discrete set of type curves (High, Medium, Low) for each of the fields. Discrete probabilities are associated with each of the realizations. For instance, as shown in FIG. 11, the initial discrete probability distribution 1100 for the uncertain production profile for field A indicates a 40 percent probability of a low scenario 1110, a 20 percent probability of a medium, or base, scenario 1120, and a 40 percent probability of a high scenario 1130. Referring to FIG. 12, the probability distribution 1200 for the uncertain production profile for all fields other than A indicates a 30 percent probability of a low scenario 1210, a 40 percent probability of a medium, or base, scenario 1220, and a 30 percent probability of a high scenario 1230.

Figure 13:
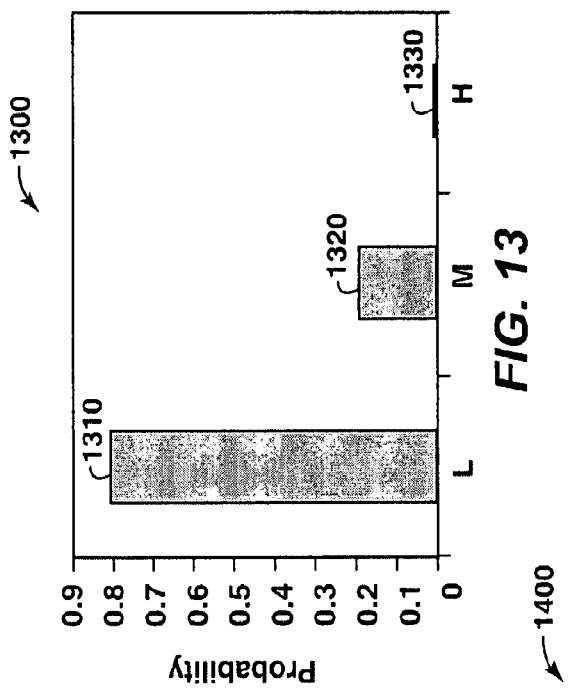
FIG. 13 is a graph representing a probability distribution for the uncertain production profile for the field A of the Example if pessimistic information is obtained after one year of production, in accordance with an exemplary embodiment.
Figure 14:
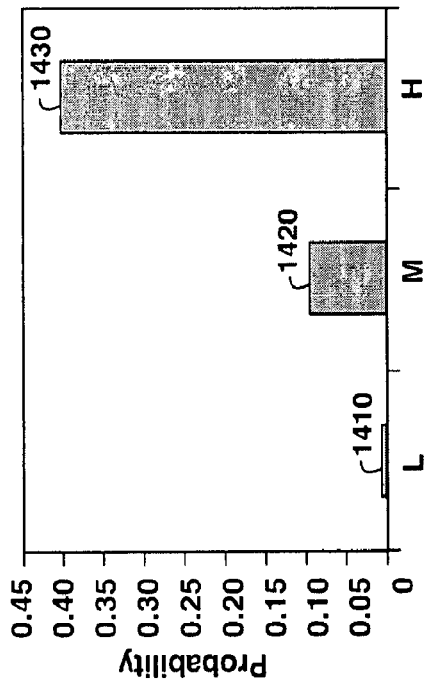
FIG. 14 is a graph representing a probability distribution for the uncertain production profile for the field A of the Example if optimistic information is obtained after one year of production, in accordance with an exemplary embodiment.

It is assumed that the uncertainty in field A will resolve partially after one year of production. This added information will result in a new probability distribution for field A. For instance, referring to FIG. 13, if pessimistic information is obtained after one year of production, the probability distribution 1300 for the uncertain production profile for field A indicates an 80 percent probability of a low scenario 1310, a 20 percent probability of a medium, or base, scenario 1320, and almost 0 percent probability of a high scenario 1330. Alternatively, referring to FIG. 14, if optimistic information is obtained after one year of production, the probability distribution 1400 for the uncertain production profile for field A indicates almost 0 percent probability of a low scenario 1410, a 20 percent probability of a medium, or base, scenario 1420, and an 80 percent probability of a high scenario 1430.

It is further assumed that the new probability distribution belongs to a discrete set of candidate probability distributions, each element of which has an associated probability. In this study, it is assumed that the new information can lead to one of two probability distributions, one where the High side is much more likely and the other where the Low side is much more likely. For simplicity, it is assumed that the probability distributions for all other fields do not change over the lifespan of the project. Consequently, the number of uncertainty scenarios in this problem is determined to be 3×3×3×2×3×3=486.

The objective of this study is to maximize the Expected Net Present Value (ENPV: probability weighted average Net Present Value) of the project. The NPV computation for each scenario accounts for oil revenues, capital costs related to FPSO installation/expansion, operation costs and taxes.

The solution from the stochastic programming approach is compared with the deterministic approach where decisions are optimized for the mean case. Learning as a result of resolution of uncertainty in field A at the end of year 1 is incorporated in the evaluation of the deterministic approach. The results for the stochastic and deterministic approaches are given in Table I below.

TABLE I

COMPARISON OF STOCHASTIC PROGRAMMING AND DETERMINISTIC APPROACHES

| | Oil Price - $30/bbl | Oil Price - $35/bbl | Oil Price - $40/bbl |
|---|---|---|---|
| Deterministic Approach | ENPV = $5.156 B<br>Install P1 at 150 kSTB/d<br>If information for A is pessimistic:<br>Expand P1 by 75 kSTB/d<br>Install P3 at 150 kSTB/d<br>Expand P3 by 75 kSTB/d<br>If information for A is optimistic:<br>Expand P1 by 75 + 50 kSTB/d<br>Install P3 at 150 kSTB/d<br>Expand P3 by 75 kSTB/d | ENPV = $6.910 B<br>Install P1 at 150 kSTB/d<br>If information for A is pessimistic:<br>Expand P1 by 75 kSTB/d<br>Install P3 at 150 kSTB/d<br>Expand P3 by 75 kSTB/d<br>If information for A is optimistic:<br>Expand P1 by 75 + 50 kSTB/d<br>Install P3 at 150 kSTB/d<br>Expand P3 by 75 kSTB/d | ENPV = $8.666 B<br>Install P1 at 150 kSTB/d<br>If information for A is pessimistic:<br>Expand P1 by 75 kSTB/d<br>Install P3 at 150 kSTB/d<br>Expand P3 by 75 + 25 kSTB/d<br>If information for A is optimistic:<br>Expand P1 by 75 + 50 kSTB/d<br>Install P3 at 225 kSTB/d<br>Expand P3 by 25 kSTB/d |
| Stochastic Programming | ENPV = $5.172 B<br>Install P1 at 150 kSTB/d<br>If information for A is pessimistic:<br>Expand P1 by 75 kSTB/d<br>Install P3 at 150 kSTB/d<br>Expand P3 by 75 + 50 kSTB/d<br>If information for A is optimistic:<br>Expand P1 by 75 + 50 + 25 kSTB/d<br>Install P3 at 150 kSTB/d<br>Expand P3 by 75 + 50 kSTB/d | ENPV = $7.032 B<br>Install P1 at 150 kSTB/d<br>If information for A is pessimistic:<br>Expand P1 by 75 kSTB/d<br>Install P3 at 150 kSTB/d<br>Expand P3 by 75 + 50 kSTB/d<br>If information for A is optimistic:<br>Expand P1 by 75 + 50 + 25 kSTB/d<br>Install P3 at 150 kSTB/d<br>Expand P3 by 75 + 50 kSTB/d | ENPV = $8.896 B<br>Install P1 at 225 kSTB/d<br>If information for A is pessimistic:<br>Install P3 at 150 kSTB/d<br>Expand P3 by 75 + 50 kSTB/d<br>If information for A is optimistic:<br>Expand P1 by 75 kSTB/d<br>Install P3 at 225 kSTB/d<br>Expand P3 by 75 kSTB/d |
| Difference in ENPV | $16 Million | $122 Million | $230 Million |

As shown in Table I above, the results for the stochastic and deterministic approaches are fairly different with the stochastic programming solution improving over the deterministic approach solution by up to $230 Million in ENPV. An important reason for the stochastic program leading to a better solution is that since all uncertainty scenarios are explicitly evaluated in the optimization model, it is able to better assess the value of a large FPSO in this case (in the form of a set of potentially large reservoir sizes). The deterministic approach on the other hand bases decisions on the mean case and hence can not assess the value of a large FPSO accurately.

These results also highlight the flexibility in solutions provided by stochastic programming. When the oil price is $40/bbl, the optimal solution from the stochastic programming approach provides the flexibility to adjust the capacity expansions in platforms P1 and P3 based on the information obtained for field A.

Thus, exemplary embodiments of the present invention are well adapted to carry out the objects and attain the benefits and advantages mentioned as well as those which are inherent therein. It is understood that variations may be made in the foregoing without departing from the scope and spirit of the invention. For example, the teachings of the present illustrative embodiments may be used to enhance the computational efficiency of other types of n-dimensional computer models. Although illustrative embodiments of the present invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope and spirit of the invention.

What is claimed is:

1. A computer-based method of optimizing development planning for a hydrocarbon reservoir, comprising:
   providing input data representative of the hydrocarbon reservoir, the input data having an uncertainty associated therewith;
   generating a first simulation of the reservoir using a high fidelity model for reservoir or surface facility behavior utilizing the input data, wherein the first simulation generates first high fidelity output data;
   generating a low fidelity model for reservoir or surface facility behavior using the input data and the first high fidelity output data, wherein the low fidelity model generates a prediction;
   optimizing a reservoir development planning model utilizing the input data and the low fidelity model for reservoir or surface facility behavior, wherein the reservoir development planning model generates reservoir development planning output data and the reservoir development planning model comprises a stochastic programming model that incorporates uncertainty;
   performing a second simulation of the reservoir using the high fidelity model for reservoir or surface facility behavior utilizing the input data and the reservoir development planning output data, wherein the second simulation generates second high fidelity output data;
   comparing the second high fidelity output data with the prediction of the low fidelity model;
   repeating the steps comprising generating a low fidelity model for reservoir or surface facility behavior, optimizing a reservoir development planning model, performing a second simulation of the reservoir using the high fidelity model for reservoir or surface facility behavior, and comparing the second high fidelity output data with the prediction of the low fidelity model until the second high fidelity output data is substantially consistent with the prediction of the low fidelity model.

2. The method of claim 1, further comprising: generating a development plan in response to the second high fidelity output data being substantially consistent with the prediction of the low fidelity model.

3. The method of claim 1, wherein a solution routine, interfacing with the stochastic programming model, assists the stochastic programming model to optimize development planning for the reservoir.

4. The method of claim 1, wherein the stochastic programming model comprises a solution routine for assisting with optimizing development planning for the reservoir.

5. The method of claim 1, wherein the input data includes one or more of fluid dynamics of the reservoir, size of the reservoir, a current state of reservoir development, a price of petroleum, a cost to drill into the reservoir, a cost of rig time for a rig to operate with the reservoir, and a capital cost relevant to drilling or managing the reservoir.

6. A method of producing hydrocarbons from a subterranean reservoir, comprising:
   generating a reservoir development planning system based on input data representative of the reservoir, wherein the reservoir development planning system comprises: the stochastic programming model comprising a low fidelity reservoir model; and a high fidelity reservoir model, wherein the high fidelity model accepts one or more parameter input data from the stochastic programming model and provides one or more reservoir or surface facility property input data to the stochastic programming model;
   optimizing the reservoir development planning system via a stochastic programming model and according to an uncertainty space; and
   producing hydrocarbons from the reservoir according to output from the optimized reservoir development planning system.

7. The method of claim 6, wherein the input data comprises deterministic components and nondeterministic components, and
   wherein the step of optimizing the reservoir development planning system according to the uncertainty space comprises considering each of the nondeterministic components with the stochastic programming model.

8. The method of claim 6, wherein the stochastic programming model incorporates uncertainty of the input data.

9. The method of claim 6, wherein the uncertainty space specifies inherent uncertainty of the input data.

10. The method of claim 6, wherein optimizing the reservoir development planning system comprises:
   simulating operation of the reservoir using a high fidelity model; and
   simulating operation of the reservoir using a low fidelity model.

11. The method of claim 6, wherein the data includes one or more of fluid dynamics of the reservoir, size of the reservoir, a current state of reservoir development, a price of petroleum, a cost to drill into the reservoir, a cost of rig time for a rig to operate with the reservoir, and a capital cost relevant to drilling or managing the reservoir.

* * * * *